United States Patent [19]
Eldering et al.

[11] Patent Number: 5,881,362
[45] Date of Patent: Mar. 9, 1999

[54] METHOD OF INGRESS NOISE REDUCTION IN CALBE RETURN PATHS

[75] Inventors: Charles A. Eldering, Doylestown; Herbert M. Lustig, North Wales, both of Pa.

[73] Assignee: General Instrument Corporation of Delaware, Horsham, Pa.

[21] Appl. No.: 709,456

[22] Filed: Sep. 5, 1996

Related U.S. Application Data

[63] Continuation of Ser. No. 347,573, Nov. 30, 1994, abandoned.

[51] Int. Cl.$^6$ .................................................. H04N 7/10
[52] U.S. Cl. ........................... 455/4.2; 455/5.1; 348/7; 348/12; 348/13
[58] Field of Search .................... 348/5.5, 6, 8, 7, 348/9, 10, 11, 12, 13, 14, 15, 16, 17, 21, 192, 193, 607, 608, 618, 622, 624; 455/3.1, 3.2, 3.3, 41, 4.2, 5.1, 6.1, 6.2, 6.3, 49.1, 50.1, 63, 296, 307; 329/318, 321, 349, 353; 332/107, 123, 159; 340/310.03; 364/514 A; H04N 7/10

[56] References Cited

U.S. PATENT DOCUMENTS 4,512,033  4/1985  Schrock ................................ 348/12 X
5,594,726  1/1997  Thompson et al. .................. 348/12 X

*Primary Examiner*—Nathan J. Flynn
*Attorney, Agent, or Firm*—Barry R. Lipsitz; Ralph F. Hoppin

[57] ABSTRACT

A method of reducing noise and ingress in cable return paths is disclosed in which the return frequency spectrum is divided into two regions; one frequency region being for transmissions from in-home devices such as television set-tops and personal computers, and another frequency region being for transmissions from communications devices called coaxial termination units located between the drop cable and the home coaxial wiring. By locating blocking filters between the drop cable and home coaxial wiring, undesirable signals emanating in the home in the second part of the return spectrum are prevented from entering the cable return system. The location of the blocking filter reduces the noise in the second part of the return spectrum substantially and allows the establishment of reliable telecommunications services on the cable return in such second part of the return spectrum. The blocking filters can be incorporated into the coaxial termination unit and the bandwidth of such filters varied from the head-end to allow more or less bandwidth to be used by in-home devices.

14 Claims, 9 Drawing Sheets

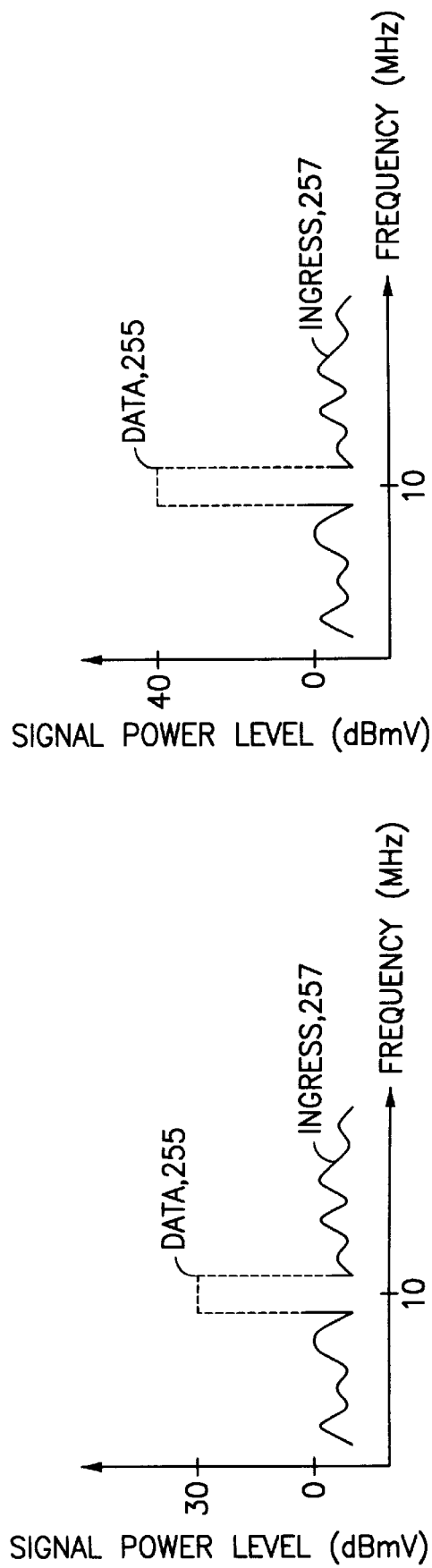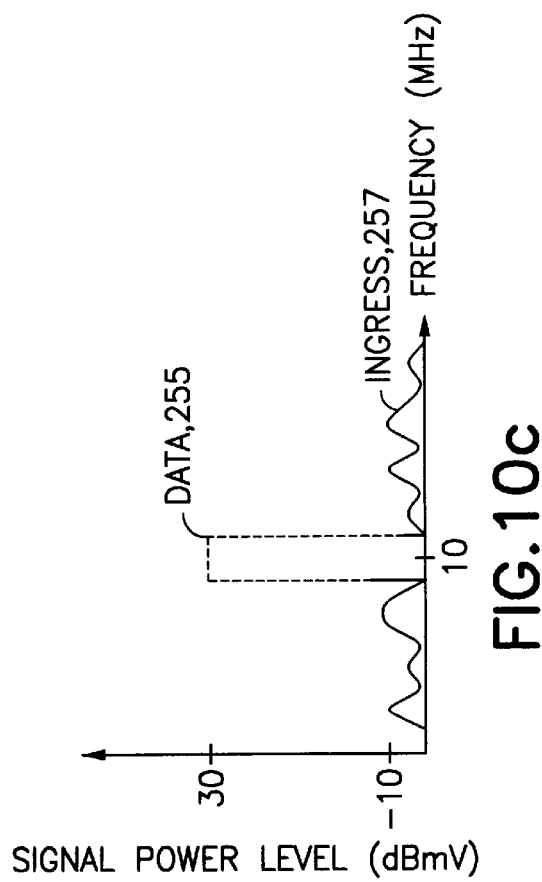
FIG.10a
FIG.10b
FIG.10c

METHOD OF INGRESS NOISE REDUCTION IN CALBE RETURN PATHS

This is a continuation of application Ser. No. 08/347,573, filed on Nov. 30, 1994 now abandoned.

FIELD OF THE INVENTION

The present invention relates to cable television systems in which a return communication path is provided.

BACKGROUND OF THE INVENTION

In cable TV systems, also known as Community Access Television (CATV) systems, a return path is often provided to allow signals from the subscriber equipment to be sent to the central control point, or head-end. The cable return path is typically used to allow subscribers to request movies by entering a request through their cable television receiving equipment (settop). The basic return service for purchasing movies is commonly referred to as "pay per view". Because the CATV system offers a high bandwidth connection to the subscriber, there is the potential for providing a number of other services including video on demand,(VOD) in which a subscriber can instantaneously request, view, rewind, and fast-forward a movie. Personal computers can also be connected to the cable plant and data transmitted from the subscriber location to the head-end. In these applications the signaling from the subscriber equipment to the head-end is generally in the form of a packet of information. In the event that the packet is not received correctly, retransmission can be requested from the subscriber via a retransmission protocol communicated from the head-end to the subscriber equipment in the downstream link.

Telecommunications services can be provided by placing a transmitter and receiver with an appropriate line circuit to drive the telephone at the subscriber location. Such equipment can be located on the side of the subscriber's residence or in the basement of an apartment building or business location and is referred to herein as a coaxial termination unit. Services which would be provided by the coaxial termination unit include Plain Old Telephony service (POTs), advanced telephony services such as Integrated Services Digital Network (ISDN), videotelephony, and high speed data services including Asynchronous Transfer Mode (ATM). In these applications no retransmission protocol is utilized because of the high total data rate involved and the requirement for low network delay; it is therefore necessary to provide a low error rate connection both to and from the subscriber. A typical measure of the performance of the connection is the ratio of the number bits received in error to the number of correctly received bits, referred to as the bit error ratio or BER. For telecommunications links a BER of $\leq 10^{-10}$ is the performance goal.

Because the configuration of the cable system is multipoint-to-point from the subscribers to the head-end, the return path has the undesirable characteristic of accumulating or "funneling" noise towards the head-end. The number of subscribers connected to the network is typically greater than 500, and many subscribers can have power dividers (splitters) installed in their homes to allow connection of multiple settops to the cable network. The result of the large number of subscribers and the multiple connections in the home is that there are a large number of points on the cable network where undesirable signals can enter the return path. The commonly used term for undesirable signals on the cable return path is ingress. Ingress is typically AM shortwave broadcast signals and industrial and atmospheric noise, which can enter on the drop cable connecting the subscriber to the cable plant connection termed the tap, and via the coaxial wiring in the subscriber residence or business location. The coaxial wiring used in the home may be of low quality, and will allow ingress because of the low amount of shielding provided with respect to high quality coaxial cable which has a dense braided wire shield which provides high isolation of the center conductor from external electromagnetic fields. The coaxial wiring in the home is also typically unterminated, and can act as an antenna since currents generated on the outside of the shield can to some extent couple to the inside of the shield at the unterminated end and subsequently excite the center conductor. The accumulation of noise on the return path has adversely limited the use of the return path for many purposes.

In some hybrid cable systems lasers are used to transmit signals over an optical fiber to an intermediate location (a node) where the optical signal is converted to an electrical signal and transmitted to the subscriber on coaxial cable. Such a configuration is commonly referred to as a hybrid fiber-coax system. A similar hybrid fiber-coax configuration is used in the return path, where signals from the subscriber are transmitted in a low frequency band (e.g. 5–30 MHz) on the coaxial cable, and subsequently modulated onto a laser for transmission from the node to the head-end via optical cable. In hybrid fiber-coax transmission systems, the noise in the return path is a concern not only because of the resulting degradation in signal-to-noise or signal-to-interference ratio, but because when the total noise is significant the laser may be overmodulated, with the result being that the laser momentarily shuts off or "clips". Because additional communications services are being planned which will utilize the return path, the amount of information the return laser will be required to transmit will increase, and it is possible that clipping in the return path laser will become a limitation in the return path system performance. Use of a lower degree of optical modulation can have economical disadvantages since in order to maintain the same signal-to-noise ratio on an optical link, lowering the degree of optical modulation will require the use of a more powerful and hence more expensive laser. It is thus important to limit the amount of noise in the return path to reduce the noise power to the laser, as well as to maintain a high signal-to-noise and signal-to-interference ratio.

SUMMARY OF THE INVENTION

The present invention is embodied in a method in which noise and interference are significantly reduced in cable return systems by the use of blocking filters which keep undesirable signals generated in the home from entering the cable return system.

The cable return band is divided into two frequency bands, a first frequency band for transmissions from television settops or personal computers located inside the subscriber residence or business location, and a second frequency band for transmissions from a telecommunications terminal which is located at the side of the residence or in the basement. In the second frequency band, signals coming from the cables inside the residence are highly attenuated in a blocking filter so that noise and undesirable signals originating from inside the home in the second frequency band are effectively blocked from entering the return system. Signals from inside the home can be transmitted in the first frequency band at a power high enough to overcome signal-to-noise and signal-to-interference limitations. In the event that these signals are too high in power for the active elements (e.g. amplifiers and/or lasers)to retransmit them without distortion, they can be attenuated at the input of the active devices. Signals from the telecommunications terminal are transmitted in the second band and are coupled into the return path after the blocking filter. The second frequency band has less noise due to the presence of the attenuating filters on the subscriber residences.

By blocking signals from inside the residence in the second band, the total noise power in the return path is reduced, thus reducing the amount of power which modulates the return path laser. The reduction in power helps prevent overdriving of the laser. The present invention thus not only serves to reduce interfering signals in the second return frequency band and thus provide a high signal-to-interference ratio for telecommunications signals, but will greatly reduce the total amount of noise in the return path.

In a typical application the present invention would be realized by deploying a telecommunications terminal referred to as a coaxial termination unit on the side of a subscriber residence. The terminal can couple signal power to and from the coaxial connection to the residence. Inside the residence a splitter would be used to connect from the single coaxial cable entering the residence to the multiple coaxial cables in the home, some of which are connected to television settops or personal computers, and some of which are left unconnected and unterminated, and act as small antennas, picking up broadcast signals and industrial or atmospheric noise. A blocking (bandstop) filter is located in the telecommunications terminal and blocks signals in the 15–40 MHz region of the return frequency band while passing signals in the 5–15 MHz region of the return frequency band. Signals from settops and personal computers are transmitted in the 5–15 MHz region at signal levels in the range of 30–60 dBmV. Additional amplification of these signals can be provided by an amplifier in the coaxial termination unit. Signals from the coaxial termination unit in the 15–40 MHz region are added after the blocking filter and are transmitted at a signal level in the range of 20–50 dBmV. The net result of the invention is a significant reduction in the noise in the 15–40 MHz return frequency band as well as a reduction total noise entering the return system. Reduction of the of the total noise entering the system allows a higher index of modulation of the return path laser without danger of clipping or noise multiplication, which allows the use of a lower power and lower cost laser than would be possible if a lower index of modulation were required due to the high total noise power.

An advantage of the present invention is that by locating the blocking filter in the coaxial termination unit the network operator can have a high degree of control over the characteristics of the filter as well as the ability to monitor the subscriber connection to assure that the filter has not been disconnected or bypassed. Control over the filter can be provided by issuing commands carried in the downstream transmission and received by the coaxial termination unit. The downstream commands can include commands which change the bandwidth of the filter and modify the first and second return frequency band. The coaxial termination unit can be equipped with alarm generation features which will indicate to the operator that the unit has been opened without proper authorization, indicating that the filter may have been tampered with. The ability to detect that the filter may have been tampered with is important in assuring that filters have been left in place and can perform the noise and ingress reducing function.

BRIEF DESCRIPTION OF THE DRAWINGS

These and other features, aspects, and advantages of the present invention will become better understood with regard to the following description, appended claims, and accompanying drawings where:

FIG. 10 illustrates the effects of increasing signal power to maintain a higher signal-to-interference ratio and the subsequent attenuation of the signal to avoid overloading circuit elements.

DESCRIPTION OF THE PREFERRED EMBODIMENT OR EMBODIMENTS

Figure 1:
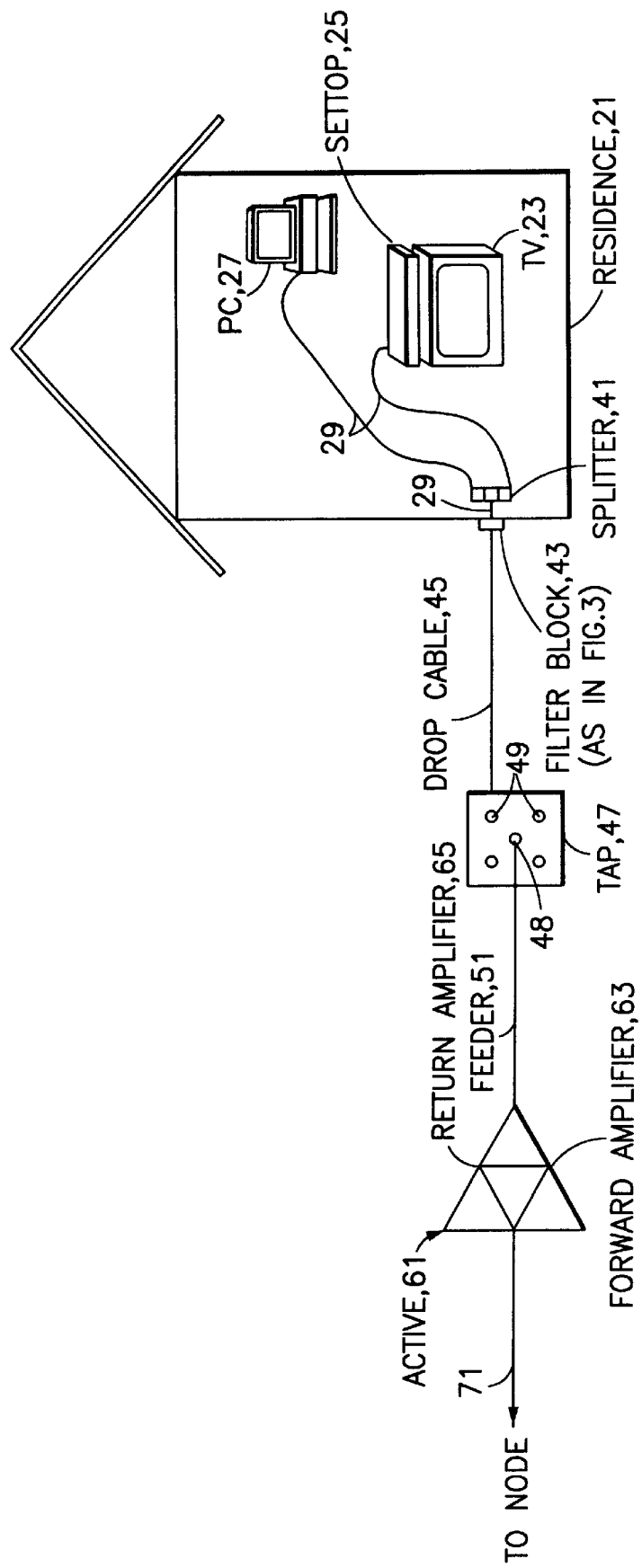
FIG. 1 shows a first embodiment of the invention in which a residence with a television settop and personal computer with a cable modem is connected to a return path with a filter block disposed between the in-home splitter and the drop cable.
Figure 3:
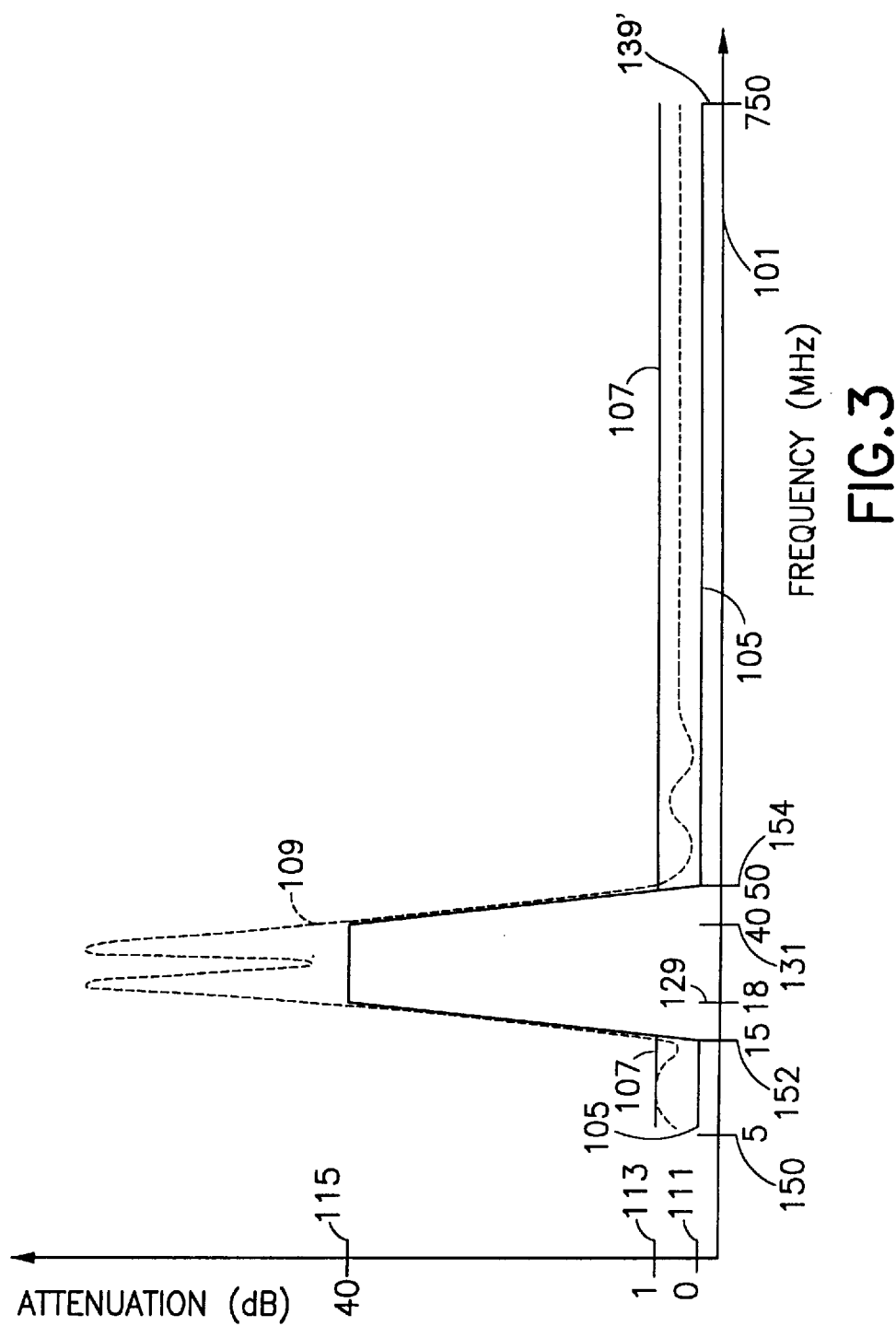
FIG. 3 illustrates the overall desired filtering characteristics as seen between in-home transmitter (settop or PC) and the cable plant used in conjunction with the present invention.

In the first embodiment of the invention a filter block can be mounted on the side of a subscriber residence to block signals from the home in a second return frequency band. Referring to FIG. 1, the subscriber residence (21) has within a settop (25) connected to a TV (23) and a PC (27). The settop (25), PC (27) shown in FIG. 1 are connected to the cable network via home coaxial wiring (29) and a splitter (41) which are located in the residence. A filter block (43) having the overall filtering characteristics shown in FIG. 3 is located between the splitter and the drop cable (45). A tap, (47) having an input port (48) and output ports (49) connects the drop cable to a coaxial cable referred to as the feeder (51). A two-way amplifier (61), also known as an active, contains a forward amplifier (63) and a return amplifier (65) and provides gain for transmission of forward signals to the subscriber and for return signals to the node (71).

The overall filtering characteristics of the filter in the first embodiment are shown in FIG. 3 and are such that the signal in the forward direction is not attenuated substantially while return signals are not attenuated in a first part of the return band and are heavily attenuated in a second part of the return band. FIG. 3 illustrates the characteristics of such a filter, which is shown as the filter block (43) in FIG. 1. The filter characteristics are shown as having a lower attenuation limit (105) and an upper attenuation limit (107) in the passband regions, which are 5–15 MHz and 50–750 MHz. The passband frequencies are defined by a first passband start (150) and first passband stop (152) and a second passband start (154) and a specification stop (139'). The stopband of 18–40 MHz is specified by a stopband start (129) and a stopband stop (131). The filter performance is specified from the first passband start (150) to the specification stop (139'). In the passband the attenuation would be specified by a passband attenuation lower limit (111) and a passband attenuation upper limit (113). The stopband is specified by a stopband attenuation lower limit (115). As shown in FIG. 3, the response of the filter is such that signals in the 5–15 and 50–750 frequency bands are attenuated by less than 1 dB, but no gain is provided, so that the minimum attenuation is 0 dB. Signals in the 18–40 MHz band are attenuated by at least 40 dB. Signals in the 15–18 MHz band and 40–50 MHz band are attenuated by varying amounts since these are the transition regions of the filter.

By dividing the return band into two regions, 5–15 MHz and 15–40 MHz, and requiring in-home devices to transmit only in the 5–15 MHz portion of the spectrum, the filter characteristics illustrated in FIG. 3 allow transmissions from settops and PC's to pass through the return system while blocking noise and undesirable signals in the 15–40 MHz portion of the spectrum. This will reduce the total amount of noise in the system and reduce the amount of noise in 15–40 MHz portion of the spectrum dramatically, since many of the undesirable signals in the cable return emanate from inside the home. Other communications devices located outside the home can then use the 15–40 MHz portion of the spectrum for telecommunications services.

Since there is still noise and ingress present in the 5–15 MHz portion of the return frequency band, it is essential that the settop or PC transmitters transmit at a power level high enough to maintain a BER of $\leq 10^{-6}$. The communications from the settop or PC are packet based, and if a packet is not received correctly by the head-end, a retransmission of the packet can be requested.

Figure 7:
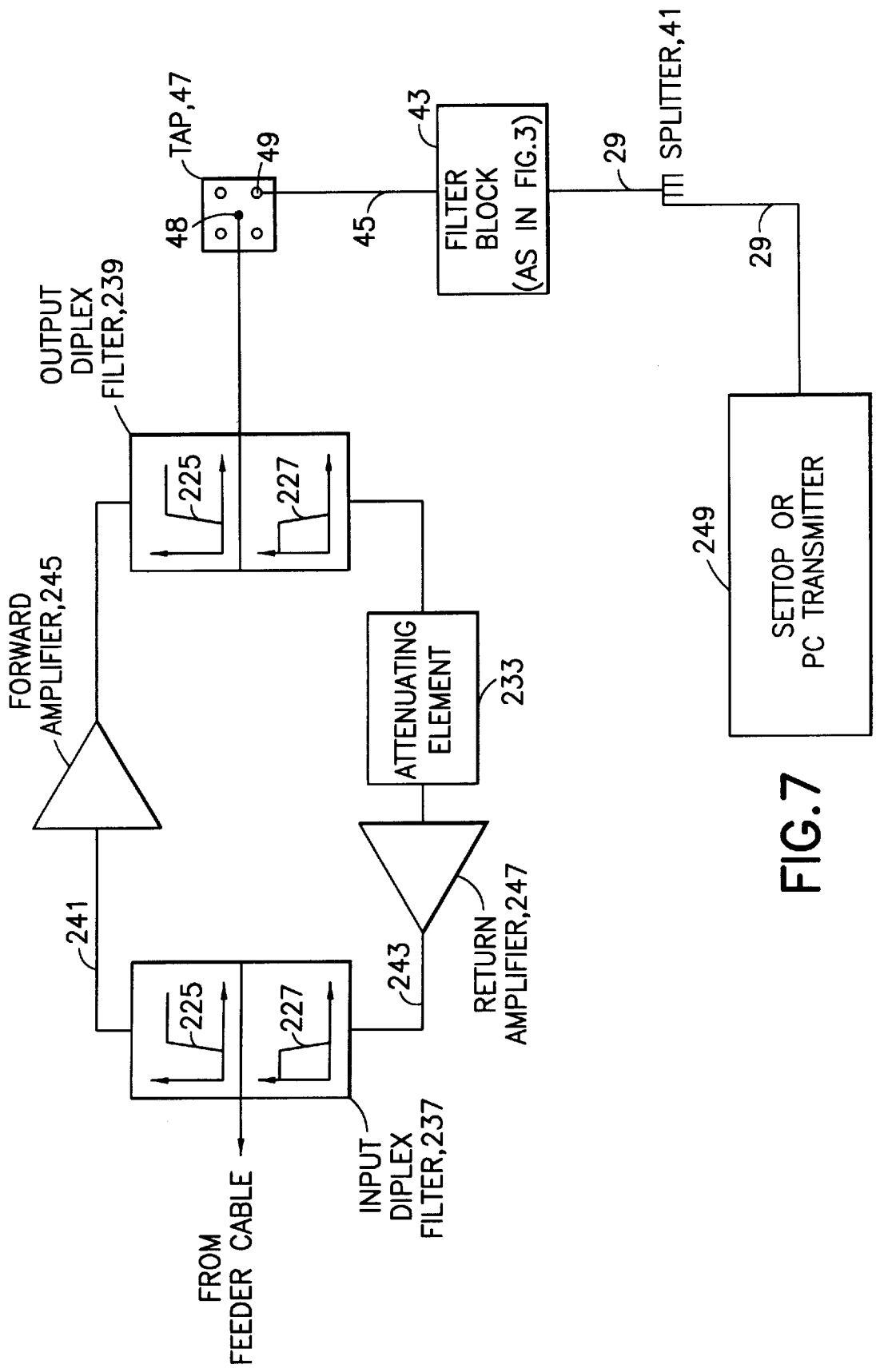
FIG. 7 illustrates a two-way amplifier (active) with attenuating unit, filter block and settop or PC transmitter.

The return path for a settop or PC is shown in FIG. 7 in which a settop or PC transmitter (249) is connected to a splitter (41) via home coaxial wiring (29), which is also used to connect the splitter to the filter block (43) having the characteristics shown in FIG. 3. A drop cable (45) connects the filter block to the output port (49) of a tap (47). The input port (48) of the tap is fed by a feeder cable (51) which connects to the output of the active (61). At the output of the active (the input for the return system) an output diplex filter (239) separates forward and return signals by use of a diplex filter high pass section (225) and a diplex filter low pass section (227). In the input of the active (the output for the return system) an input diplex filter (237) separates forward and return signals by use of a diplex filter high pass section (225) and a diplex filter low pass section (227). Signals in the forward path (241) are amplified by a forward amplifier (245) and signals in the return path (243) are amplified by a return amplifier (247).

If the signal level coming from the settop or PC is too high in level an attenuating element (233) can be used to reduce the signal level before subsequent amplification by a fixed gain stage. FIG. 10 illustrates the effect of increasing the signal level of a desired signal. In FIG. 10a the data (255) is shown to have a power level 30 dB greater than the ingress power level (257). In FIG. 10b the data is shown being transmitted 40 dB above the ingress level. In FIG. 10c the data and ingress are shown to have been attenuated so as to meet the maximum data power level permitted at the input of an active (61). This attenuation takes place in the attenuating element (233) shown in FIG. 7. If the gain stage is not fixed but instead variable gain, the attenuating element is unnecessary since the gain in the return amplifier can be reduced. By increasing the power transmitted at the settop it is possible to overcome the effect of the ingress.

In the design of the return system the goal is to have all signal levels from transmitters at the inputs to the actives be the same signal level. For video signals the recommended level is 24 dBmV although the coaxial termination unit level may range from 16–26 dBmV. For data signals the corresponding levels will be lower, and for systems in which the return spectrum has 52 data signals in the 5–15 MHz range and 12 data signals in the 15–40 MHz range the signal level will be 8–16 dB below the video signal level. Thus a typical value for the signals from settops or PC's as seen at the input of the return active is 12–16 dBmV. In order to allow for different amounts of loss between the transmitter and the active, the settop or PC transmitter must have means for controlling the output power of the transmitter.

Figure 9:
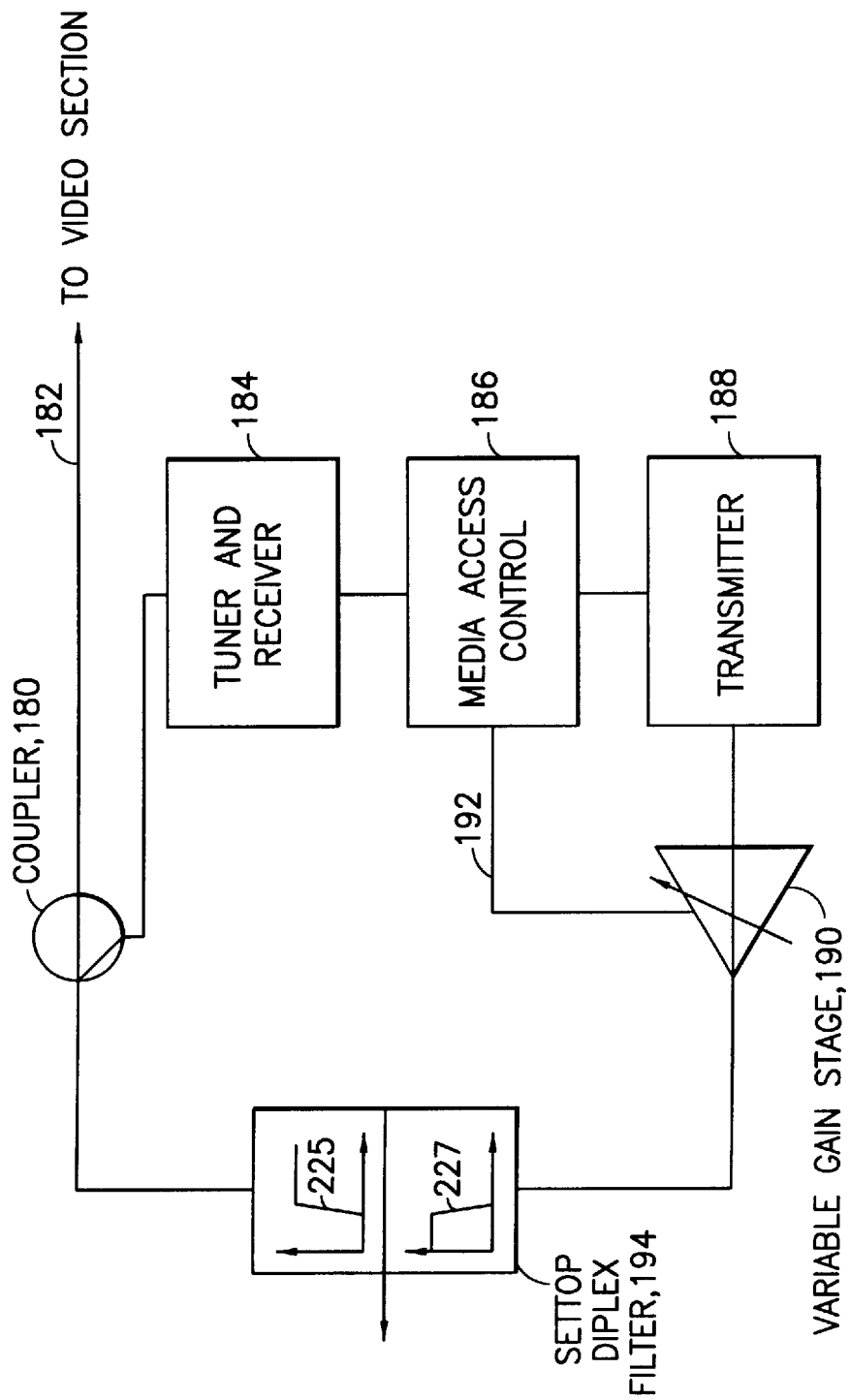
FIG. 9 illustrates a settop block diagram including the return path transmitter and power control.

FIG. 9 illustrates the return and data section of a settop and is presented to show how power of signals entering the return path can be controlled at the settop. Referring to FIG. 9, forward and return signals are separated by the settop diplex filter (194) which separates the downstream signal from the return signals by use of a diplex filter high pass section (225) and a diplex filter low pass section (227). A coupler (180) is used to separate a portion of the power of the downstream signal which is sent to tuner and receiver (184) which recovers and demodulates a downstream data signal, while the remaining power is send to the video section (182). A logic and computing unit entitled media access control (186) performs the functions of receiving downstream messages and generating return messages, as well as forming the packets for transmission and adjusting the timing so that the transmissions are synchronized with the transmissions of other subscribers and do not overlap those transmissions. Packets for transmission are sent to the transmitter (188) and a variable gain stage (190) provides the proper output power. A closed loop control system in which the head-end senses the power in the received packets is used to determine if a particular settop needs to increase or decrease the power in its return transmissions. Such control loops are typically used in point-to-multipoint communications systems and can be applied to all types of multiple access schemes including Time Division Multiple Access (TDMA), Code Division Multiple Access (CDMA) and Frequency Division Multiple Access (FDMA). Regardless of the multiple access scheme used, it is necessary to control the output power of the settop using the media access control (186) and variable gain stage (190) shown in FIG. 9 so that the desired signal-to-interference ratio can be maintained as shown in FIG. 10. The attenuating element (233) shown in FIG. 7 can then be used to maintain the proper input levels at the input of the active (61) in FIGS. 1 and 7.

Figure 4:
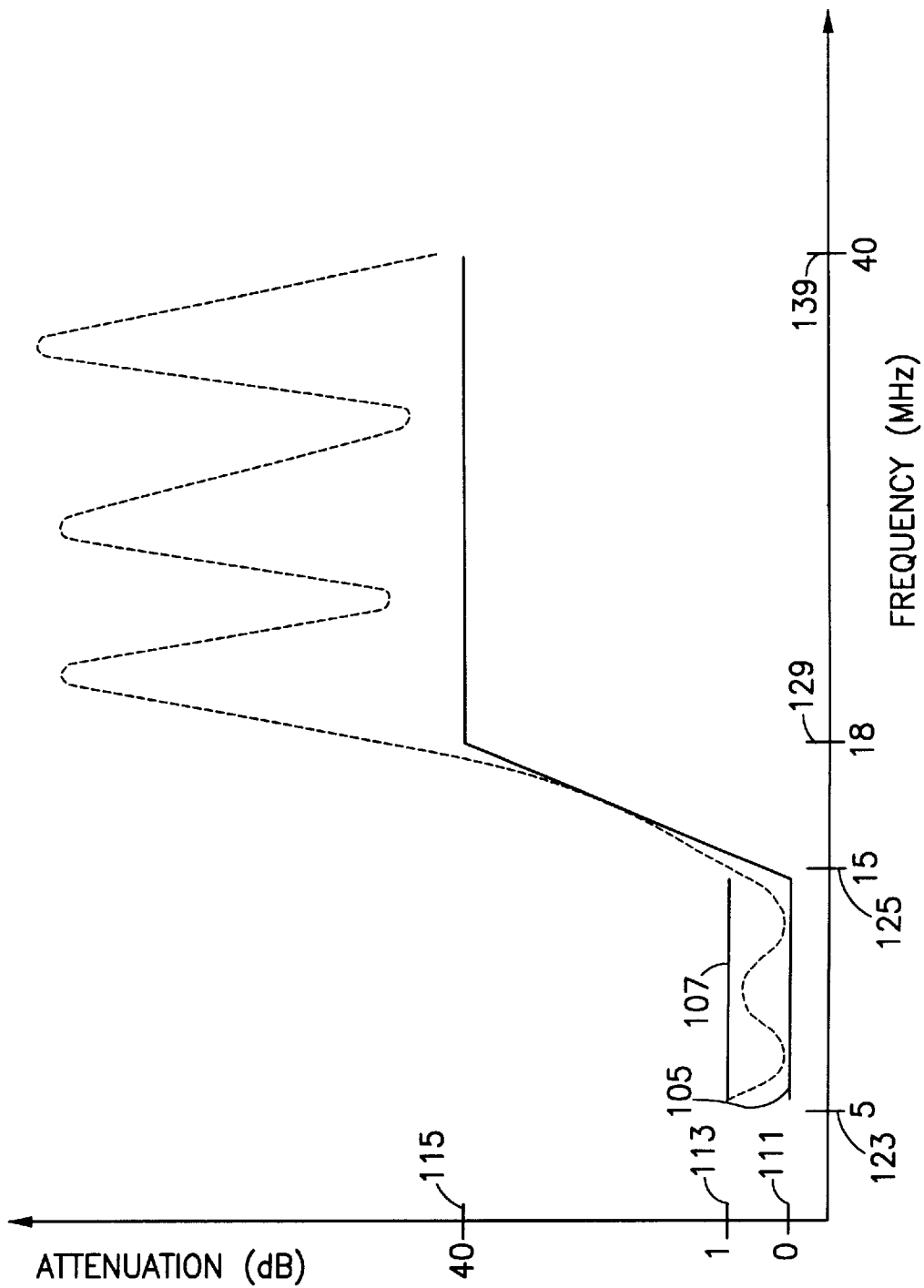
FIG. 4 illustrates the desired filtering and attenuating characteristics of a filter when incorporated in the side of home (coaxial termination unit) filter used in the present invention.
Figure 8:
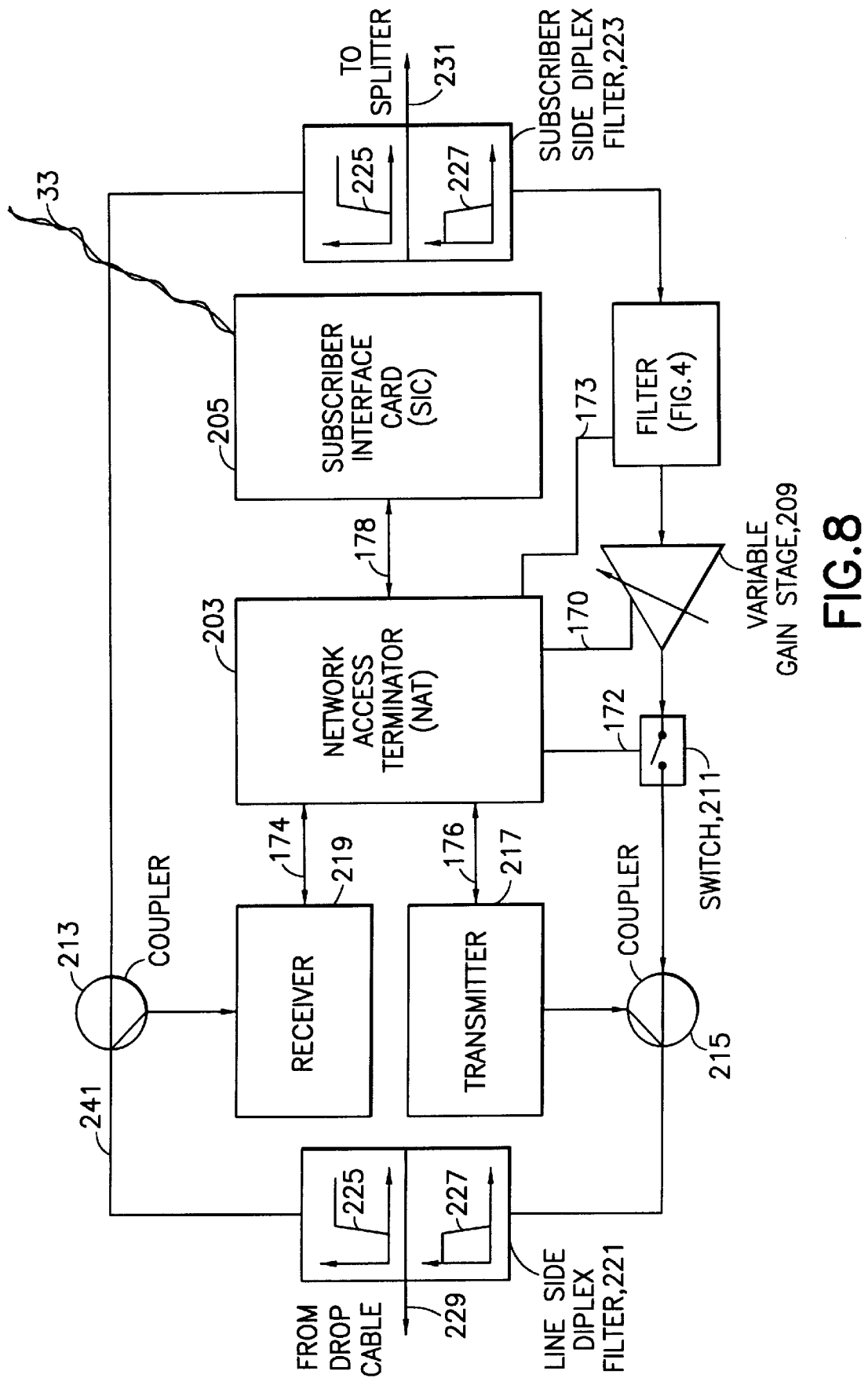
FIG. 8 illustrates a coaxial termination unit with incorporated filter.

The first embodiment, illustrated in FIG. 1, allows communications in a first return frequency band by devices inside a subscriber residence or business location, while reducing the total noise in the return system and protecting a second return frequency band by use of a bandstop filter in a filter block located between the in-home wiring and the tap. One method of realizing the overall filtering characteristics as shown in FIG. 3 of the filter block (43) as shown in FIG. 1 is to use the combination of a line side diplex filter (221) as shown in FIG. 8, a subscriber side diplex filter (223) as shown in FIG. 8, and a low pass filter as shown in FIG. 4. The low pass filter shown in FIG. 4 is placed in series with the subscriber side diplex filter low pass section (227) and the line side diplex filter low pass section (227).

Other communications services emanating from a location after the filter block utilize a second frequency band in the return spectrum which has reduced noise and interference with respect to the first frequency band. These services are provided to other subscribers on the network who have additional equipment such as the coaxial termination unit (201) shown in FIG. 2., but can also emanate from terminals in the field which are not associated with any particular residence but instead are terminal which provide services to a number of subscribers. They are functionally equivalent to the coaxial termination unit (201) shown in FIG. 2, but may support from 8–96 subscribers, with a typical application supporting 24 subscribers.

In the first embodiment, the power of the transmitters in the residence are controlled from the head-end using a closed loop feedback system, so that the power in the actives and return laser is kept at a specified level. The power of the in-home transmitter is controlled so that a BER of $\leq 10^{-6}$ can be maintained. Retransmission of incorrectly received packets is obtained by requesting retransmission from the head-end.

Figure 2:
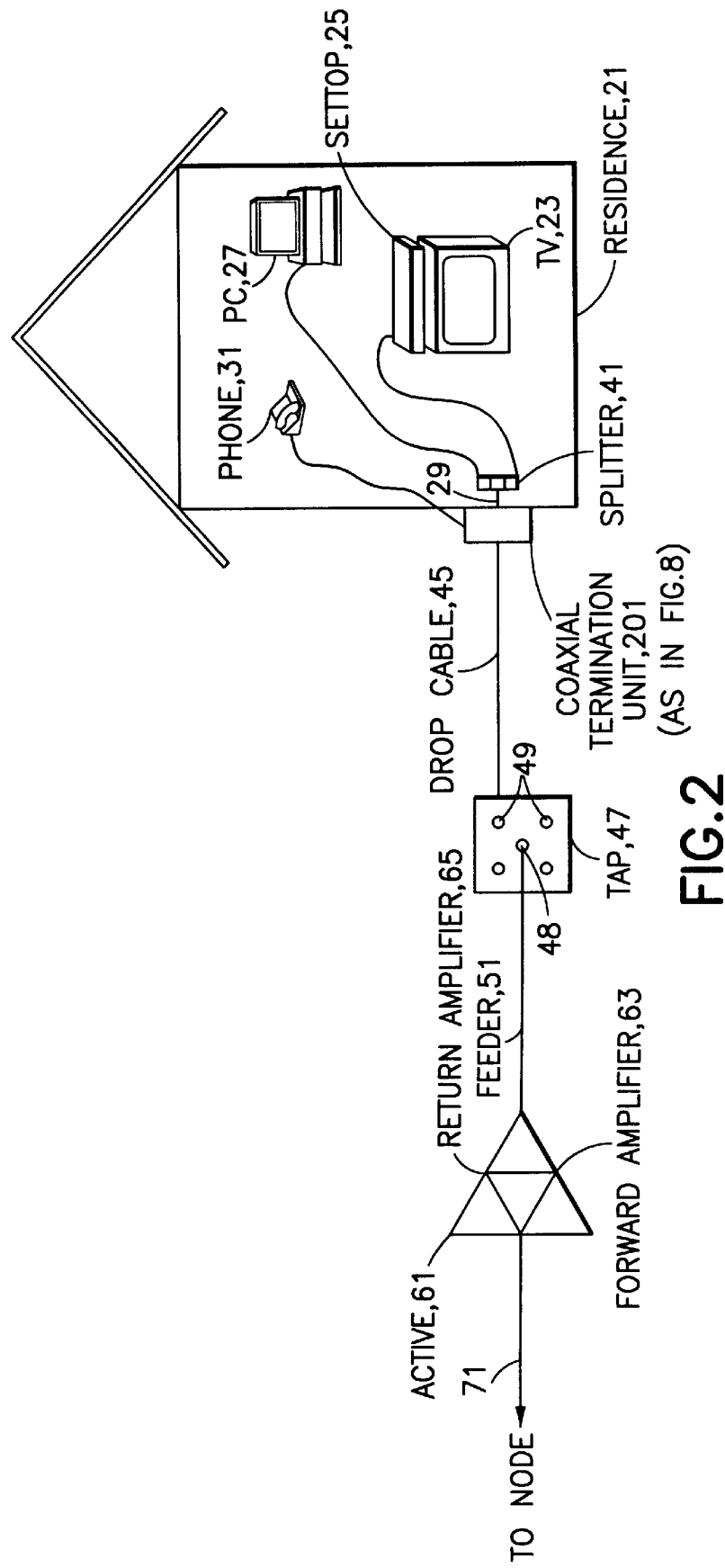
FIG. 2 shows a second embodiment of the invention where the residence has a coaxial termination unit which provides telecommunications services on the side of the home.

In the second embodiment of the invention a coaxial termination unit can be mounted on the side of a subscriber residence to provide telecommunications services such as Plain Old Telephony service (POTs) or Integrated Services Digital Network (ISDN) services in a second return frequency band, while blocking signals from the home in that band. Referring to FIG. 2, the subscriber residence (21) has a coaxial termination unit (201) which provides telephony services to a phone (31) via phone wiring (33). The residence also has within a TV (23) and settop (25) and a PC (27). The settop (25) and PC (27) are connected to the cable network via home coaxial wiring (29) and a splitter (41) which are located in the residence. The coaxial termination unit is connected to the splitter via a short section of home coaxial wiring, and to the network by a drop cable (45). The tap, (47) having an input port (48) and output ports (49) connects the drop cable to a coaxial cable referred to as the feeder (51). A two-way amplifier referred to in general as an active (61) contains a forward amplifier (63) and a return amplifier (65) and provides gain for transmission of forward signals to the subscriber and for return signals to the node (71).

The coaxial termination unit provides the functions of receiving and transmitting telecommunications signals, as well as driving any telecommunications devices in the home. These devices may be as simple as traditional telephones, or may be videotelephony terminals or workstations which utilize high speed data services.

Referring to FIG. 8 the coaxial termination unit contains a connection from the drop cable (229) followed by a line side diplex filter (221) which divides signals into a forward branch (241) and a return branch (243) via a diplex filter high pass section (225) for the forward branch and a diplex filer low pass section (227) for the return branch.

On the forward branch a first coupler (213) is used to couple off a portion of the downstream power to be received by a receiver (219) which tunes and demodulates the data for transmission via a receiver-network access terminator bus (174) to a logic circuit and computing device entitled network access terminator (203), which performs the functions of demultiplexing the telecommunications data and receiving control and signaling commands from the head-end.

The telecommunications signals a re transmitted to and received from the subscriber interface card (205) via the network access terminator-subscriber interface card bus (178). The subscriber interface card (205) is capable of driving the phone or other telecommunications device over the phone wiring (33). Telecommunications signals from the phone or telecommunications device received at the subscriber interface card (205) are passed to the network access terminator (203) via the network access terminator-subscriber interface card bus (178) and from the network access terminator (203) to the transmitter (217) via the transmitter-network access terminator bus (176) for transmission upstream. Power from the transmitter (217) is coupled into the return branch via a second coupler (215).

Signals which emanate from inside the home enter through the connection to the splitter (231) and subscriber side diplex filter (223) which contains a diplex filter high pass section (225) and a diplex filter low pass section (227). A low pass filter which is illustrated in FIG. 4 allows the transmissions in the 5–15 MHz return frequency band to pass, but attenuates signals in the 15–50 MHz band. A variable gain stage (209) can be used to boost the level of the transmissions in the 15–40 MHz return frequency band. In addition, a switch (211) is present to allow disconnection of the return band from the in home coaxial wiring in the event that a large amplitude interfering signal is determined by the head-end to be present in that subscribers residence. The characteristics of the filter of FIG. 8 can be modified by filter control signal (173) and the gain of the variable gain stage (209) can be controlled by the gain control signal (170).

The characteristics of the low pass filter shown as an element in FIG. 8 are shown in FIG. 4. The filter characteristics in FIG. 4 are shown as having a lower attenuation limit (105) and an upper attenuation limit (107). Filter characteristics are specified by a specification start (123), specification stop (139), a passband stop (125) and a stopband start (129). In the passband the attenuation would be specified by a passband attenuation lower limit (111) and a passband attenuation upper limit (113). The stopband is specified by a stopband attenuation lower limit (115). As shown in FIG. 4, the response of the filter is such that signals in the 5–15 MHz band are attenuated by less than 1 dB, but no gain is provided, so that the minimum attenuation is 0 dB. Signals in the 18–40 MHz band are attenuated by at least 40 dB. Signals in the 15–18 MHz band are attenuated by varying amounts since this is the transition region of the filter.

The network access terminator (203) of the coaxial termination unit shown in FIG. 8 can receive commands from the head-end which require modification of the low pass filter parameters, control of the gain stage, or opening or closing of the switch. Control of these parameters is obtained by use of a gain control signal (170), a switch control signal (172) and a filter control signal (173), all illustrated in FIG. 8.

If the network operator desires to allocate more bandwidth to in-home devices such as settops (25) and PC's (27) as shown in FIG. 2, it can modify the characteristics of the low pass filter (235) shown in FIG. 8. Using commands sent downstream, received by the receiver (219), transmitted to the network access terminator (203) via the receiver-network access terminator bus (174), and interpreted by the network access terminator (203) commands are issued to the filter by the network access terminator (203) via the filter control signal (173).

If the operator decides that more bandwidth is required by in-home devices the low pass filter (235) characteristics can be modified to decrease the stopband region of the filter, which is equivalent to narrowing the second return frequency range and widening the first return frequency range. If the operator decides that more bandwidth is required by the coaxial termination unit, the characteristics of the low pass filter (235) can be modified so as to increase the stopband region of the filter, which is equivalent to widening the second return frequency range and narrowing the second return frequency range.

In the event that no return services are required from inside the residence or business location, and instead all services will be provided by the coaxial termination unit (201) shown in FIG. 2, downstream commands can be issued to the network access terminator (203) shown in FIG. 8 which cause the switch (211) to be opened by the switch control signal (172). Opening the switch (211) will effectively disconnect the residence or business location from the cable return system.

A further advantage of the coaxial termination unit is that if the unit is tampered with, it will be possible to send alarms to the head-end via the network access terminator (203) and transmitter (217). This can be accomplished by means of switches and alarms which sense when the coaxial termination unit has been opened by an unauthorized person. Opening of the coaxial termination unit by an unauthorized person can indicate that the filter may have been tampered with or bypassed altogether. A tamper alarm system within the coaxial termination helps insure that the low pass filter (235) shown in FIG. 8 is left in place and performs the function of reducing noise and ingress in the return system.

Figure 5:
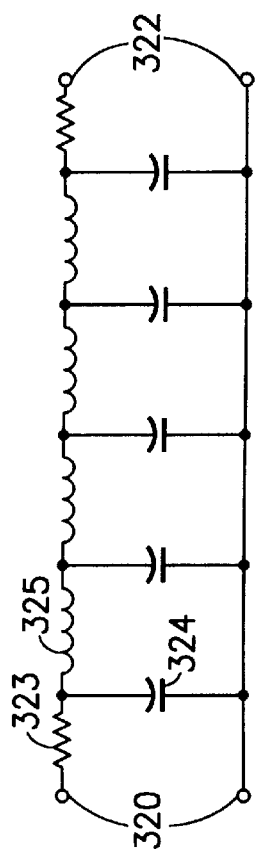
FIG. 5 illustrates a passive low-pass filter.

Many filter designs can be used to meet the requirements illustrated in FIG. 4. A typical passive filter design is shown in FIG. 5, and illustrates a doubly-terminated reactance two-port ladder network composed of capacitors (324) and inductors (325), where the resistive loss is provided by resistors (323). For the passive filter of FIG. 5 an input signal from a voltage source is excited across the input terminals (320) and the filtered signal appears across the output terminals (322).

Figure 6:
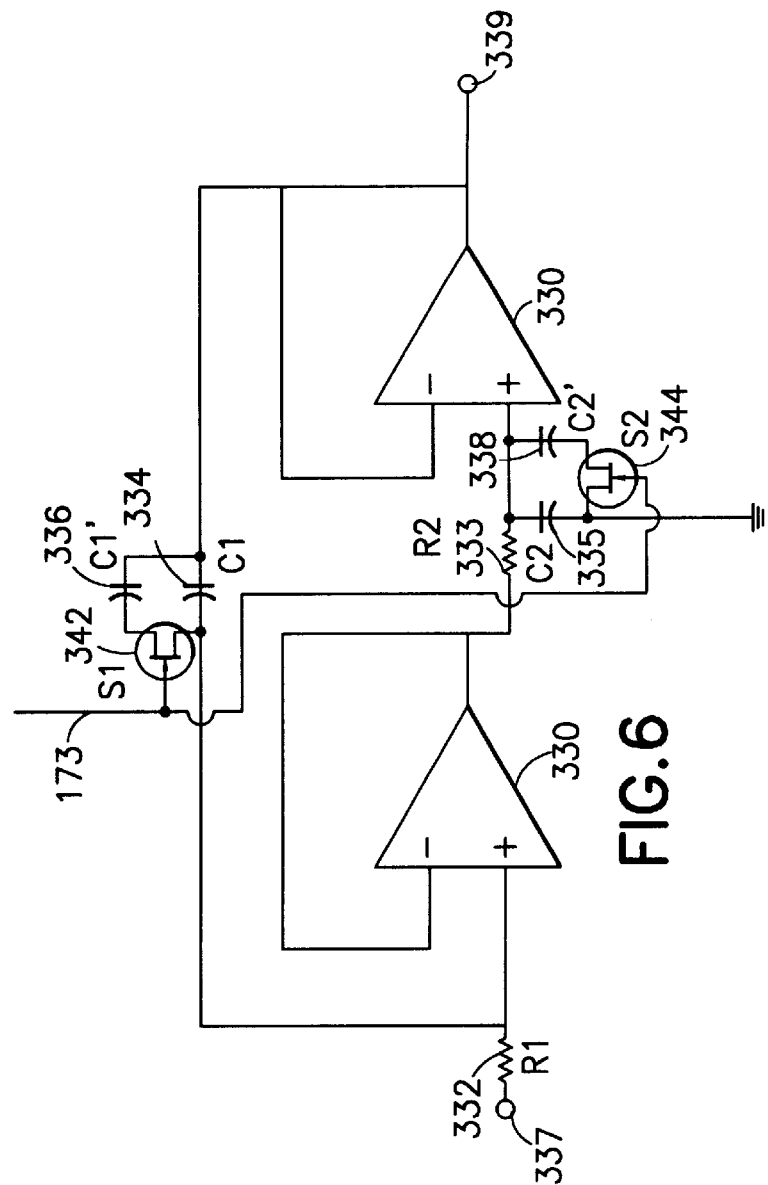
FIG. 6 illustrates an active low-pass filter whose characteristics can be electrically modified.

An active filter design is illustrated in FIG. 6 where amplifiers (330) are connected in a network comprised of resistors R1(332), R2 (333), and capacitors C1 (334) and C2 (335). For the active filter of FIG. 6 an input signal from a voltage source referenced to ground is placed on the active filter input (337)and the filtered version appears at the active filter output (339). The filter designs shown in FIGS. 5 and 6 are not exhaustive and are given only as examples.

Variable bandwidth designs in which the bandwidth of the low pass filter (235) as shown in FIG. 8 where the bandwidth is varied by a filter control signal (173) are also well known by filter designers. Variable bandwidth filters can be realized by switching in and switching out inductors (325) and capacitors (324) in a passive filter such as the filter shown in FIG. 5, or by varying the capacitance of C1 (334) and C2 (335) of the active filter shown in FIG. 6. The bandwidth of the filter illustrated in FIG. 6 is changed by enabling (placing in a conductive state) switches S1 (342) and S2 (344). This is accomplished by raising the voltage on the filter control signal (173), which places increases the capacitance in the circuit by adding an additional capacitor, C1' (336) and C2' (338). Increasing the total capacitance in the circuit decreases the bandwidth of the low pass filter by lowering the stopband frequency. In the active filter of FIG. 6, resistors R1 (332) and R2 (333) control the Q of the circuit, with the Q being proportional to the value of R1 (332) the Q being inversely proportional to the value of R2 (333).

The present invention solves the problem removing of noise and ingress in cable return plants which originates in the home as a result of the numerous unterminated coaxial connections and low-cost coaxial cable with reduced shielding capabilities which is used in the home. The filtering devices used between the home coaxial wiring and the exterior CATV plant prevent signals in a second return frequency band from entering the cable return. Communications terminals placed either in the home or at any other location in the plant after such a filtering device can then use that second return frequency band for telecommunications services which must have an extremely low BER and which cannot use retransmission protocols for data received in error. For transmission devices used in the home, the power transmitted should be at a level so as to maintain a reasonable BER, but when interference is present, the in-home transmission device can change frequency or retransmit the packets of information. Since the data channels used by the in-home devices will tend to be small with respect to the width of the first return frequency band, there are a relatively large number of channels available and the in-home devices can be instructed to change frequency to an interference free channel. The network operator can vary the bandwidth allocated to the first return frequency band by varying the bandwidth of the filter which passes signals from the residence or business location.

An important feature of the invention is that by reducing the total amount of noise and ingress present in the cable return, the amount of noise power which modulates the return laser is also reduced. This is an important feature because it allows the optical modulation index of the return laser to be kept relatively high (in the range of 4–6%) since the signals to the laser are data signals of known power. Otherwise, the amount of noise and ingress which reaches the laser can be high enough that it will require reduction in the modulation index of the laser to 2–4%. When the modulation index is reduced, the signal level at the optical receiver is reduced, and white noise in the receiver becomes the limiting factor in maintaining the proper signal-to-noise ratio. In some cases a much more powerful laser would be required to span the link from the node to the head-end while maintaining an adequate signal-to-noise ratio in the optical portion of the link.

Although the present invention has been described in considerable detail with reference to certain preferred versions thereof, other versions are possible. For example, the coaxial termination unit may not be located outside but may be in the basement, or in a closet of, a residence or business location. The coaxial termination unit may be named a network interface device or premise interface device, but when it serves as an interface or gateway to the cable return system the functionality will be the same as that given to the coaxial termination unit described herein. The cable return system may not include an optical link from the node to the head-end, but may instead be an all coaxial network. The number of subscribers served by the network may be much greater or smaller than 500, but the exact number will not affect the ability of the present invention to reduce noise on the return system when it is applied to any extent, however large or small, on the network. In some cases deployment of the filtering techniques described herein at a few locations will be sufficient to reduce the noise in the network to an acceptable level.

In operation, the first embodiment as shown in FIG. 1 is deployed at locations which do not have telecommunications terminals, but do have settops or PC's connected to the network. By deploying the filter blocks shown in FIG. 1 and illustrated in detail in FIG. 3, the total amount of noise in the cable return is reduced. The settops or PC transmitters can raise their power to the appropriate level to overcome the ingress. If the power level is too high for the actives, attenuation can be used to reduce the power at in input to the return active, as shown in FIG. 7. The second embodiment, as shown in FIG. 2, is deployed at locations where telecommunications services are provided. The coaxial termination unit shown in FIG. 2 is placed at the side of the residence or nearby in the neighborhood. Signals from the settops or PC's in the residence pass through the coaxial termination unit, but noise in the second part of the return frequency band (reserved for telecommunications) is attenuated. Telecommunications signals are inserted after the noise blocking element (filter) illustrated in FIG. 8 and in FIG. 4. In this manner both telecommunications signals and settop signals are combined on the return path, robust telecommunications services can be provided. It is also possible to have larger telecommunications terminals (coaxial network units) which are not associated with one particular residence connected to the cable network, and utilizing the second part of the return frequency band.

What is claimed is:

1. A method for reducing effects of ingress noise signals in a cable return system from a subscriber location to a central station, said return system having a common transmission path for first and second sub-bands of a return frequency band and wiring at said subscriber location having a tendency to pick up ingress signals extending in frequency through both sub-bands of said return frequency band, said method comprising the steps of:

receiving first communications signals from a first source through subscriber location wiring for transmission over said common transmission path within a portion of said first sub-band;

receiving second communications signals from a second source for transmission over said common transmission path within said second sub-band;

attenuating substantially all signal energy received from said subscriber location wiring in said second sub-band;

controlling the amount of bandwidth assigned to the first and second sub-bands of the return frequency band; and thereafter combining signals from both said first and said second sources for transmission over said common transmission path, substantially eliminating adverse effects of ingress signals from said subscriber location wiring upon communications signals from said second source transmitted over said common transmission path;

wherein said return frequency band consists of said first and second sub-bands.

2. The method of claim 1 in which said return frequency band consists of said first and second sub-bands, said first sub-band extends substantially from 5–15 MHz, and said second sub-band extends substantially from 15–30 MHz.

3. The method of claim 1 in which said return frequency band consists of said first and second sub-bands, said first sub-band extends substantially from 5–15 MHz, and said second sub-band extends substantially from 15–40 MHz.

4. The method of claim 1 in which said return frequency band consists of said first and second sub-bands, said first sub-band extends substantially from 5–20 MHz, and said second sub-band extends substantially from 20–30 MHz.

5. The method of claim 1 in which said return frequency band consists of said first and second sub-bands, said first sub-band extends substantially from 5–20 MHz, and said second sub-band extends substantially from 15–40 MHz.

6. The method of claim 1 in which signals transmitted in said first sub-band are transmitted at a level in the range of 30–60 dBmV and signals transmitted in said second sub-band are transmitted at a level in the range of 20–50 dBmV.

7. A combination for reducing effects of ingress noise signals in a cable return system from a subscriber location to a central station, said return system having a common transmission path for first and second sub-bands of a return frequency band and wiring at said subscriber location having a tendency to pick up ingress signals extending through both sub-bands of said return frequency band, said combination comprising:

first means for receiving communications signals from a first source through subscriber location wiring for transmission over said common transmission path within a portion of said first sub-band;

second means for receiving communications signals from a second source for transmission over said common transmission path within said second sub-band;

frequency selective filtering means connected to said first receiving means for attenuating substantially all signal energy received from said subscriber location wiring in said second sub-band, and for controlling the amount of bandwidth assigned to the first and second sub-bands of the return frequency band; and coupling means connected to said second receiving means and to said filtering means for combining, subsequent to such attenuation, signals from said first and second sources for transmission over said common transmission path, substantially eliminating adverse effects of ingress signals from said subscriber location wiring upon communication signals from said second source transmitted over said common transmission path;

wherein said return frequency band consists of said first and second sub-bands.

8. The combination of claim 7 in which said first sub-band extends substantially from 5–15 MHz, and said second sub-band extends substantially from 15–30 MHz.

9. The combination of claim 7 in which said first sub-band extends substantially from 5–15 MHz, and said second sub-band extends substantially from 15–40 MHz.

10. The combination of claim 7 in which said first sub-band extends substantially from 5–20 MHz, and said second sub-band extends substantially from 20–30 MHz.

11. The combination of claim 7 in which said first sub-band extends substantially from 5–20 MHz, and said second sub-band extends substantially from 15–40 MHz.

12. The combination of claim 7 in which signals transmitted in said first sub-band are transmitted at a level in the range of 30–60 dBmV and signals transmitted in said second sub-band are transmitted at a level in the range of 20–50 dBmV.

13. The combination of claim 7, in which the central station controls the frequency selective filtering means so as to control the amount of bandwidth assigned to the first and second sub-bands of the return frequency band.

14. The method of claim 1, comprising the further step of:

controlling the amount of bandwidth assigned to the first and second sub-bands of the return frequency band from said central station.

* * * * *